United States Patent
Kokubo et al.

(10) Patent No.: US 7,612,810 B2
(45) Date of Patent: Nov. 3, 2009

(54) REDUCTION OF EFFECT OF IMAGE PROCESSING ON IMAGE SENSOR

(75) Inventors: Asao Kokubo, Kawasaki (JP); Hiroshi Daiku, Kawasaki (JP); Jun Funakoshi, Kawasaki (JP); Yutaka Takeda, Yokohama (JP); Norihiro Yoshida, Yokohama (JP)

(73) Assignee: Fujitsu Microelectronics Limited, Tokyo (JP)

( * ) Notice: Subject to any disclaimer, the term of this patent is extended or adjusted under 35 U.S.C. 154(b) by 695 days.

(21) Appl. No.: 10/968,044

(22) Filed: Oct. 20, 2004

(65) Prior Publication Data

US 2005/0285961 A1    Dec. 29, 2005

(30) Foreign Application Priority Data

Jun. 29, 2004    (JP) .............................. 2004-191473

(51) Int. Cl.
*H04N 5/217* (2006.01)
*H04N 9/64* (2006.01)
*H04N 5/335* (2006.01)

(52) U.S. Cl. ..................... 348/241; 348/245; 348/312

(58) Field of Classification Search ......... 348/241–252, 348/220.1, 372, 312
See application file for complete search history.

(56) References Cited

U.S. PATENT DOCUMENTS

| 5,771,070 A | * | 6/1998 | Ohzu et al. | ................. 348/241 |
| 6,963,373 B2 | * | 11/2005 | Imaizumi | .................... 348/312 |
| 7,310,115 B2 | * | 12/2007 | Tanimoto | .................... 348/372 |
| 2001/0050713 A1 | * | 12/2001 | Kubo et al. | ................. 348/220 |

FOREIGN PATENT DOCUMENTS

| JP | 11-161353 | 6/1999 |
| JP | 2000-188721 | 7/2000 |
| JP | 2002-74997 | 3/2002 |

* cited by examiner

*Primary Examiner*—Nhan T Tran
*Assistant Examiner*—Mekonnen Dagnew
(74) *Attorney, Agent, or Firm*—Fujitsu Patent Center (57) ABSTRACT

A solid-state imaging device includes an image sensor configured to output image data generated by image sensing elements together with a timing signal, and an image processing unit configured to output the image data supplied from the image sensor having undergone predetermined signal processing a predetermined delay time after a timing indicated by the timing signal, the image sensor further configured to make the timing signal indicate a first timing that is at least the processing delay time earlier than a second timing indicative of a start of a valid period of the image data, and to output dummy data from the first timing to the start of the valid period of the image data.

9 Claims, 10 Drawing Sheets

REDUCTION OF EFFECT OF IMAGE PROCESSING ON IMAGE SENSOR

CROSS-REFERENCE TO RELATED APPLICATIONS

The present application is based upon and claims the benefit of priority from the prior Japanese Patent Application No. 2004-191473 filed on Jun. 29, 2004, with the Japanese Patent Office, the entire contents of which are incorporated herein by reference.

BACKGROUND OF THE INVENTION

1. Field of the Invention

The present invention generally relates to solid-state imaging devices, image sensors, image processing apparatuses, and imaging methods, and particularly relates to a solid-state imaging device that performs predetermined signal processing after acquiring image signals by use of an image sensor, as well as an image sensor, an image processing apparatus, and an imaging method for use in such solid-state imaging device.

2. Description of the Related Art

In solid-state imaging devices equipped with an image sensor such as a CCD or CMOS, signals output from the image sensor are subjected to predetermined signal processing for generation of image signals suitable for screen display, and these image signals are supplied to a next stage. Such signal processing performed in solid-state imaging devices includes defect pixel correction for correcting defects by processing the data of defect pixels contained in image signals, color interpolation for obtaining color data for each pixel based on color information obtained from a RGB Bayer pattern, shading correction for correcting the distortion of a lens based on the color data, auto white balance, gamma correction, edge processing, etc.

Figure 1:
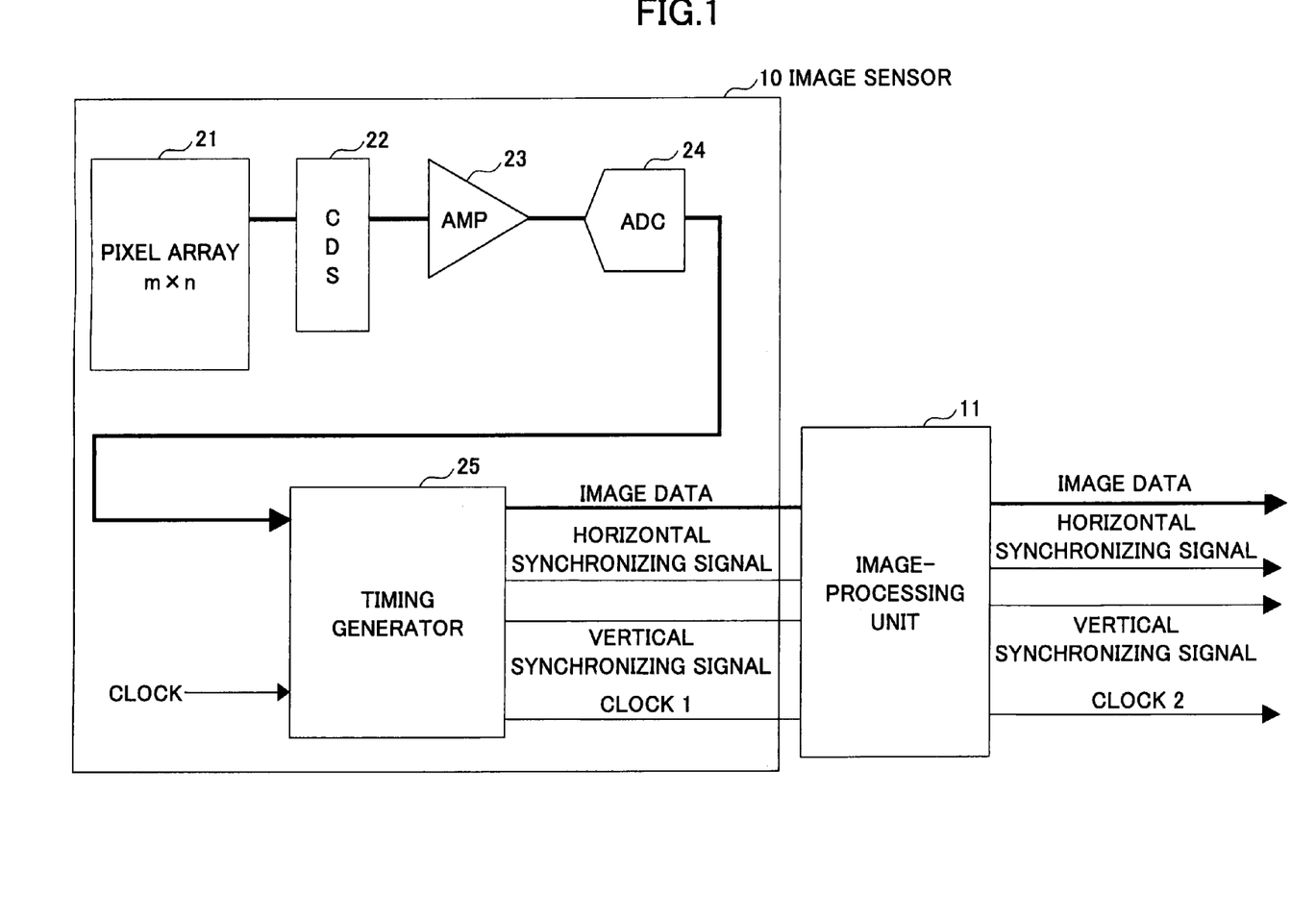
FIG. 1 is a block diagram showing an example of the construction of a related-art solid-state imaging device.

FIG. 1 is a block diagram showing an example of the construction of a related-art solid-state imaging device. The solid-state imaging device of FIG. 1 includes an image sensor 10 and an image-processing unit 11. The image sensor 10 supplies an acquired image signal as digital data to the image-processing unit 11, together with a horizontal synchronizing signal, a vertical synchronizing signal, and a clock signal. The image-processing unit 11 performs various signal processing as described above to generate digital image data for output on a screen, and supplies the data to a next stage, together with a horizontal synchronizing signal, a vertical synchronizing signal, and a clock signal.

The image sensor 10 includes a pixel array 21 of solid-state image sensing elements such as a CCD or CMOS, a noise cancellation circuit (CDS) 22, an amplifier 23, an analog-to-digital converter (ADC) 24, and a timing generator 25. The pixel array 21 is comprised of a plurality of photodiodes arranged in a matrix form to serve as a light sensing unit. These photodiodes correspond to individual pixels for the imaging purpose. Incident light is subjected to optoelectronic conversion on a pixel-by-pixel basis, and electric charge obtained through optoelectronic conversion is accumulated in a charge built-up portion for signal read. The noise cancellation circuit 22 reads an image signal from the pixel array 21 while reducing noise by correlated double sampling, for example. The obtained image signal is amplified by the differential amplifier 23, and is converted from an analog signal into a digital signal by the analog-to-digital converter 24.

The timing generator 25 generates the horizontal synchronizing signal, the vertical synchronizing signal, and the clock signal in synchronization with the digital image signal, and supplies these signals and the digital image data to the image-processing unit 11. The digital image data are divided into chunks such that image data corresponding to one individual horizontal line constitute one data chunk, and image data corresponding to individual horizontal lines are successively output chunk by chunk. Between the individual horizontal lines, a blanking period is provided where no image data exists, and serves as a margin for use for aperture adjustment or the like. The horizontal synchronizing signal indicates a valid data period for the image data corresponding to individual horizontal lines. The horizontal synchronizing signal becomes HIGH during a period where the data of each horizontal line exists, and becomes LOW in other periods.

The image-processing unit 11 applies various signal processing as described above to the supplied image data during a period in which the horizontal synchronizing signal becomes HIGH, thereby generating digital image data for output on a screen. The image-processing unit 11 further outputs the vertical synchronizing signal, the horizontal synchronizing signal, and the clock signal in synchronization with the output image data.

Figure 2:
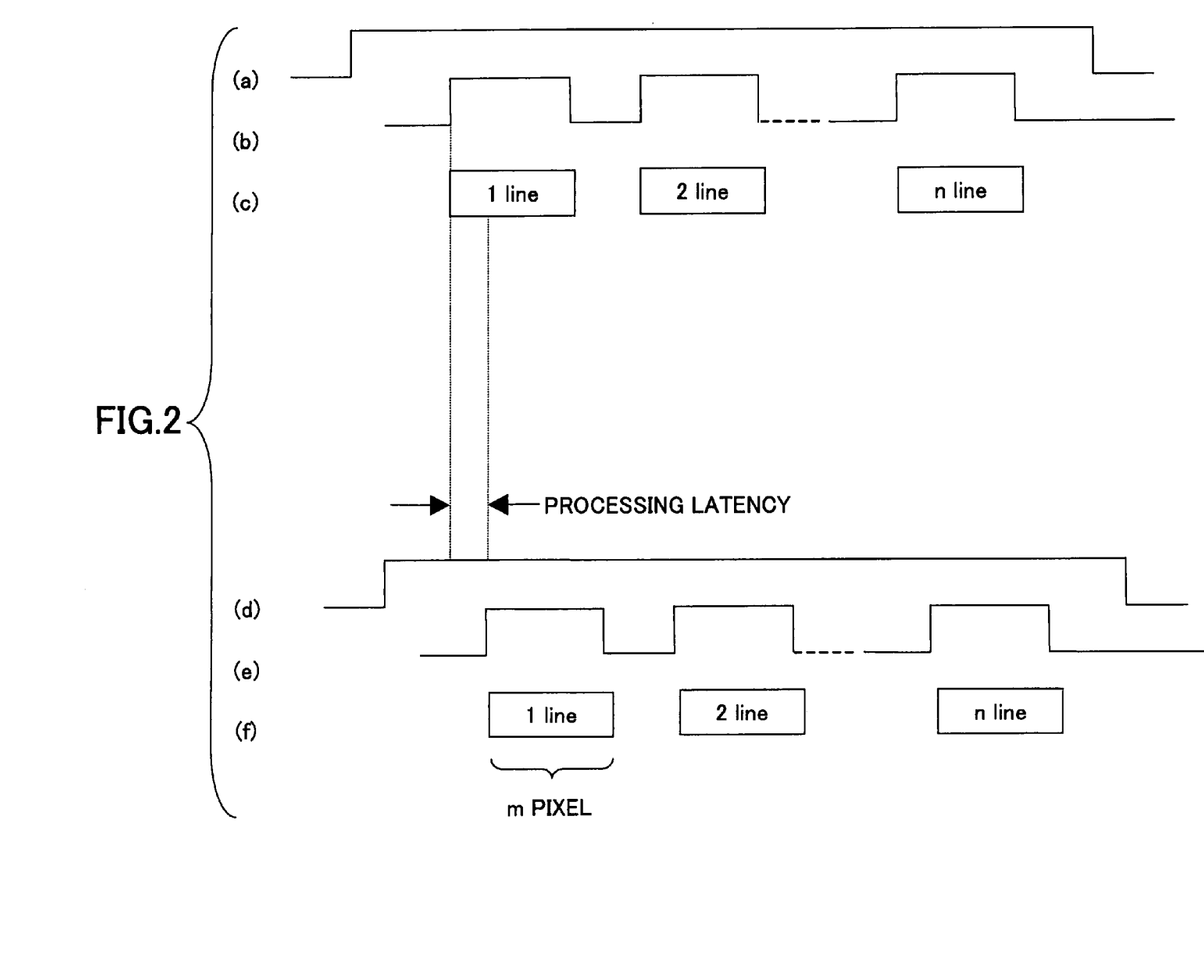
FIG. 2 is a timing chart showing timing relationships between various signals input into an image-processing unit and various signals output from the image-processing unit.

FIG. 2 is a timing chart showing timing relationships between various signals input into the image-processing unit 11 and various signals output from the image-processing unit 11. In FIG. 2, (a) designates a vertical synchronizing signal on the input side, (b) designating a horizontal synchronizing signal on the input side, and (c) designating image data on the input side. Further, (d) designates a vertical synchronizing signal on the output side, (e) designating a horizontal synchronizing signal on the output side, and (f) designating image data on the output side. As shown in FIG. 2, image data for n lines corresponding to a first line to an n-th line are supplied during a period in which the vertical synchronizing signal is HIGH. Image data corresponding to one line is equivalent to m pixels, so that the entirety of the image data corresponds to an m×n pixel array. Further, the horizontal synchronizing signal is supplied in synchronization with the image data, becoming HIGH during the valid period of the image data corresponding to each line. As shown as a processing latency in FIG. 2, there is a delay between the signals on the input side and the signals on the output side of the image-processing unit 11. This is because the image-processing unit 11 performs signal processing on the image data separately for each block, so that the image data is not processed until all the data of a given block is input into the image-processing unit 11.

[Patent Document 1] Japanese Patent Application Publication No. 2000-188721.

In order to reduce power consumption, the image-processing unit 11 does not perform signal processing during the blanking periods (periods between adjacent horizontal lines). When signal processing by the image-processing unit 11 starts after the processing latency as shown in FIG. 2, therefore, power-supply noise or the like caused by the running of the digital circuit affects the operation of an analog circuit of the image sensor 10.

Figure 3:
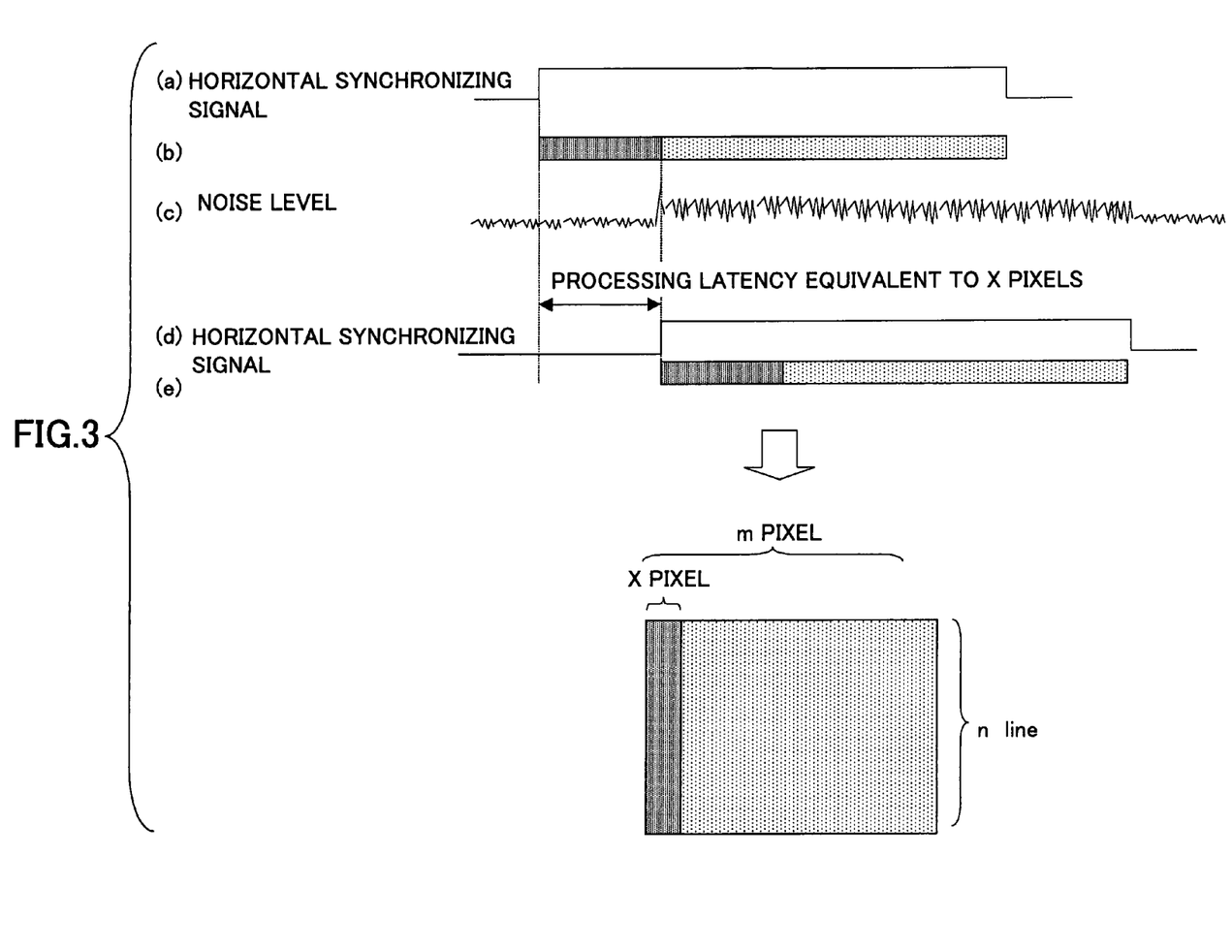
FIG. 3 is an illustrative drawing for explaining an effect of the operation of the image-processing unit on an analog circuit.

FIG. 3 is an illustrative drawing for explaining an effect of the operation of the image-processing unit 11 on an analog circuit. In FIG. 3, (a) shows the horizontal synchronizing signal output from the image sensor 10 (i.e., the horizontal synchronizing signal input into the image-processing unit 11), (b) showing image data output from the image sensor 10 (i.e., the image data input into the image-processing unit 11), (c) showing a noise level, (d) showing the horizontal synchronizing signal on the output side of the image-processing unit 11, and (e) showing the image data on the output side of the image-processing unit 11. Here, the noise level refers to noises occurring in the power supply that is commonly used by the image sensor 10 and the image-processing unit 11.

As shown in FIG. 3, an analog circuit of the image sensor 10 operates to output the image data shown in (b). While the image data is being output, the image-processing unit 11 starts its operation at the timing (corresponding to a rise of the horizontal synchronizing signal illustrated in (d)) that is delayed by the processing latency from the timing of a rise of the horizontal synchronizing signal shown in (a). As a result, the noise level shown in (c) changes into a larger noise level as the image-processing unit 11 starts its operation. This change in the noise level affects the operation of the analog circuit of the image sensor 10, so that the image data of first X pixels of the horizontal line and the image data of subsequent pixels have different levels, i.e., have a code displacement as shown in (b). Here, the number X is the number of pixels corresponds to the processing latency.

In this manner, the digital image data should be maintained generally at a fixed level in the output of the image sensor 10, but there is a code difference between before and after the start of operation due to noises caused by the operation of image-processing unit 11. Consequently, the image data output from the image-processing unit 11 after signal processing ends up having a stripe that has different brightness extending in a vertical direction of the screen with its width equal to X pixels.

Accordingly, there is a need for a solid-state imaging device in which image data is not affected by a change in the noise level caused by the start of operation of an image processing unit, and is also a need for an image sensor, an image processing apparatus, and an imaging method for use in such solid-state imaging device.

SUMMARY OF THE INVENTION

It is a general object of the present invention to provide a solid-state imaging device, an image sensor, an image processing apparatus, and an imaging method that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a solid-state imaging device, an image sensor, an image processing apparatus, and an imaging method particularly pointed out in the specification in such full, clear, concise, and exact terms as to enable a person having ordinary skill in the art to practice the invention.

To achieve these and other advantages in accordance with the purpose of the invention, the invention provides a solid-state imaging device, which includes an image sensor configured to output image data generated by image sensing elements together with a timing signal, and an image processing unit configured to output the image data supplied from the image sensor having undergone predetermined signal processing a predetermined delay time after a timing indicated by the timing signal, the image sensor further configured to make the timing signal indicate a first timing that is at least the processing delay time earlier than a second timing indicative of a start of a valid period of the image data, and to output dummy data from the first timing to the start of the valid period of the image data.

According to another aspect of the present invention, an image sensor includes image sensing elements, and a timing generator configured to output image data generated by the image sensing elements together with a timing signal, the timing generator further configured to make the timing signal indicate a first timing that is at least a processing delay time earlier than a second timing indicative of a start of a valid period of the image data, and to output dummy data from the first timing to the start of the valid period of the image data, the processing delay time being a time period necessary for image processing of the image data.

According to another aspect of the present invention, an image processing apparatus includes an image processing unit configured to receive a timing signal and image data inclusive of dummy data and valid data, and to output the image data having undergone predetermined signal processing a predetermined delay time after a timing indicated by the timing signal, the image processing unit further configured to output a timing signal indicative of a start of valid data contained in the output image data.

According to another aspect of the present invention, an imaging method includes the steps of outputting from an image sensor a timing signal indicative of a first timing that is at least a predetermined time earlier than a second timing indicative of a start of a valid period of image data obtained from image sensing elements, outputting, from the image sensor, dummy data from the first timing to the start of the valid period of the image data, outputting, from the image sensor, the image data following the dummy data, performing, by an image processing unit, predetermined signal processing on the dummy data and the image data output from the image sensor within the predetermined time from the first timing indicated by the timing signal, and outputting, from the image processing unit, image data having undergone the predetermined signal processing and a timing signal indicative of a start of a valid period of the image data having undergone the predetermined signal processing.

According to at least one embodiment of the invention, a period (HIGH-level period) of a horizontal synchronizing signal serving as the timing signal indicative of valid data is started earlier than the actual start of valid image data, and the dummy data is attached in front of the valid image data as much as necessary to compensate for the earlier start of the horizontal synchronizing signal. The image-processing unit starts its signal processing after a predetermined processing latency following the start of the horizontal synchronizing signal making the earlier start, the start of signal processing being at the same time as or earlier than the timing at which the valid image data output from the image sensor actually starts. At the same timing as or timing earlier than the timing at which the valid image data output from the image sensor actually starts, therefore, noises caused by the operation of the image-processing unit are already in existence. As a result, an analog circuit of the image sensor operates under a constant noise level to generate valid image data, so that no code displacement occurs in the middle of the valid image data. With this provision, thus, image data is not affected even if there is a change in the noise level caused by the start of operation of the image processing unit.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

Figure 4:
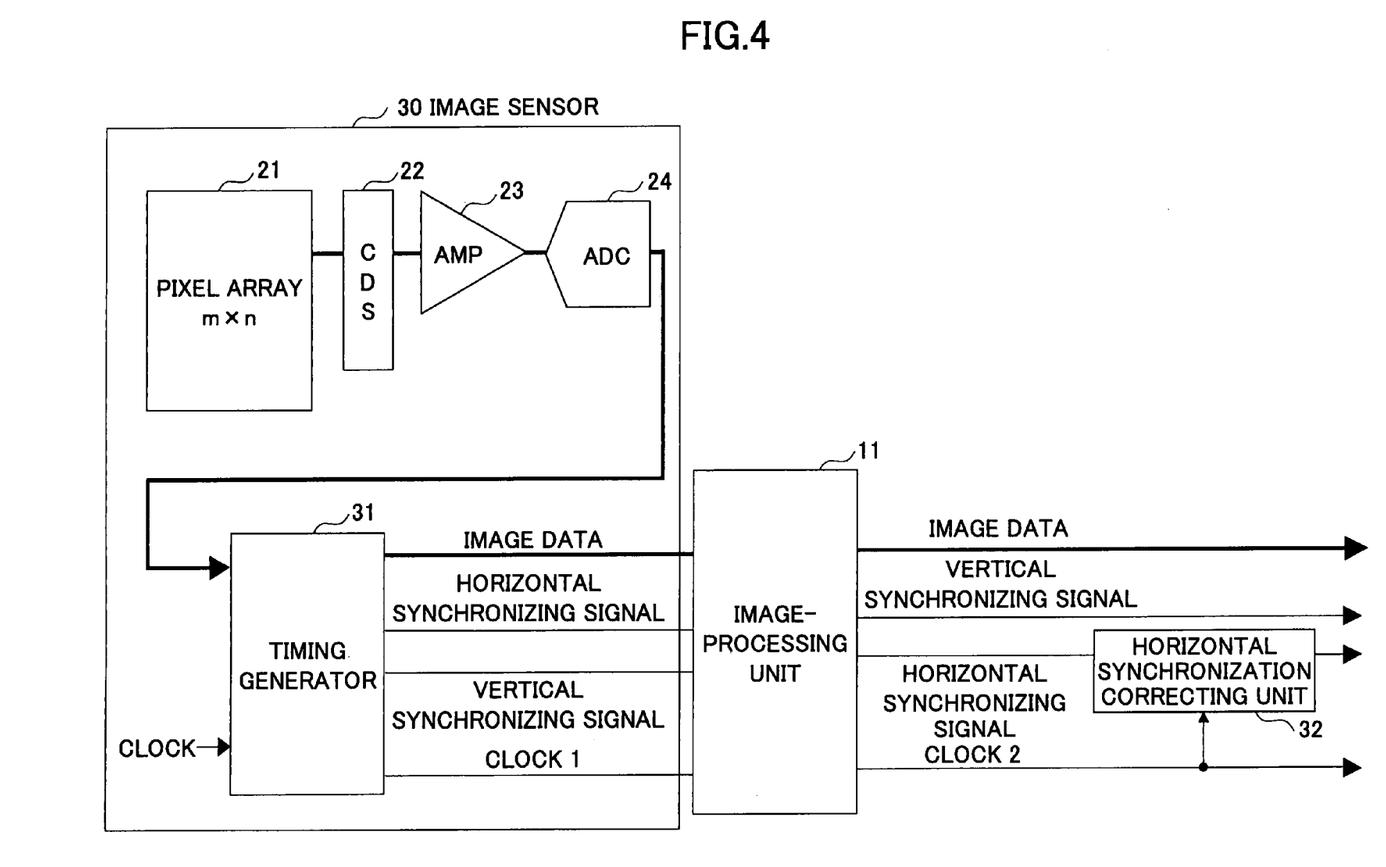
FIG. 4 is a block diagram showing an example of the construction of a solid-state imaging device according to the present invention.

FIG. 4 is a block diagram showing an example of the construction of a solid-state imaging device according to the present invention. In FIG. 4, the same elements as those of FIG. 1 are referred to by the same numerals, and a description thereof will be omitted.

The solid-state imaging device of FIG. 4 includes an image sensor 30, the image-processing unit 11, and a horizontal synchronization correcting unit 32. The image sensor 30 supplies an acquired image signal as digital data to the image-processing unit 11, together with a horizontal synchronizing signal, a vertical synchronizing signal, and a clock signal. The image-processing unit 11 performs various signal processing as described above to generate digital image data for output on a screen, and supplies the data to a next stage, together with a horizontal synchronizing signal, a vertical synchronizing signal, and a clock signal.

The image sensor 30 of FIG. 4 differs from the image sensor 10 of FIG. 1 in that a timing generator 31 is provided in place of the timing generator 25. As will be described later, the timing generator 31 starts a period (HIGH-level period) of the horizontal synchronizing signal indicative of valid data earlier than the actual start of valid image data, and attach dummy data in front of the valid image data as much as necessary to compensate for the earlier start of the horizontal synchronizing signal. The image-processing unit 11 starts its signal processing after a predetermined processing latency following the start of the horizontal synchronizing signal making the earlier start, the start of signal processing being at the same time as or earlier than the timing at which the valid image data output from the timing generator 31 actually starts. At the same timing as or timing earlier than the timing at which the valid image data output from the timing generator 31 actually starts, noises caused by the operation of the image-processing unit 11 are already in existence. As a result, the analog circuit of the image sensor 30 operates under a constant noise level to generate valid image data, so that no code displacement occurs in the middle of the valid image data.

The horizontal synchronization correcting unit 32 shown in FIG. 4 corrects the horizontal synchronizing signal that is output from the image-processing unit 11 earlier than normal timing, thereby generating a horizontal synchronizing signal matching the period of actual valid image data. With this provision, a circuit situated at a subsequent stage to which the image-processing unit 11 supplies its outputs receives a horizontal synchronizing signal indicative of a correct valid period of the image data.

Figure 5:
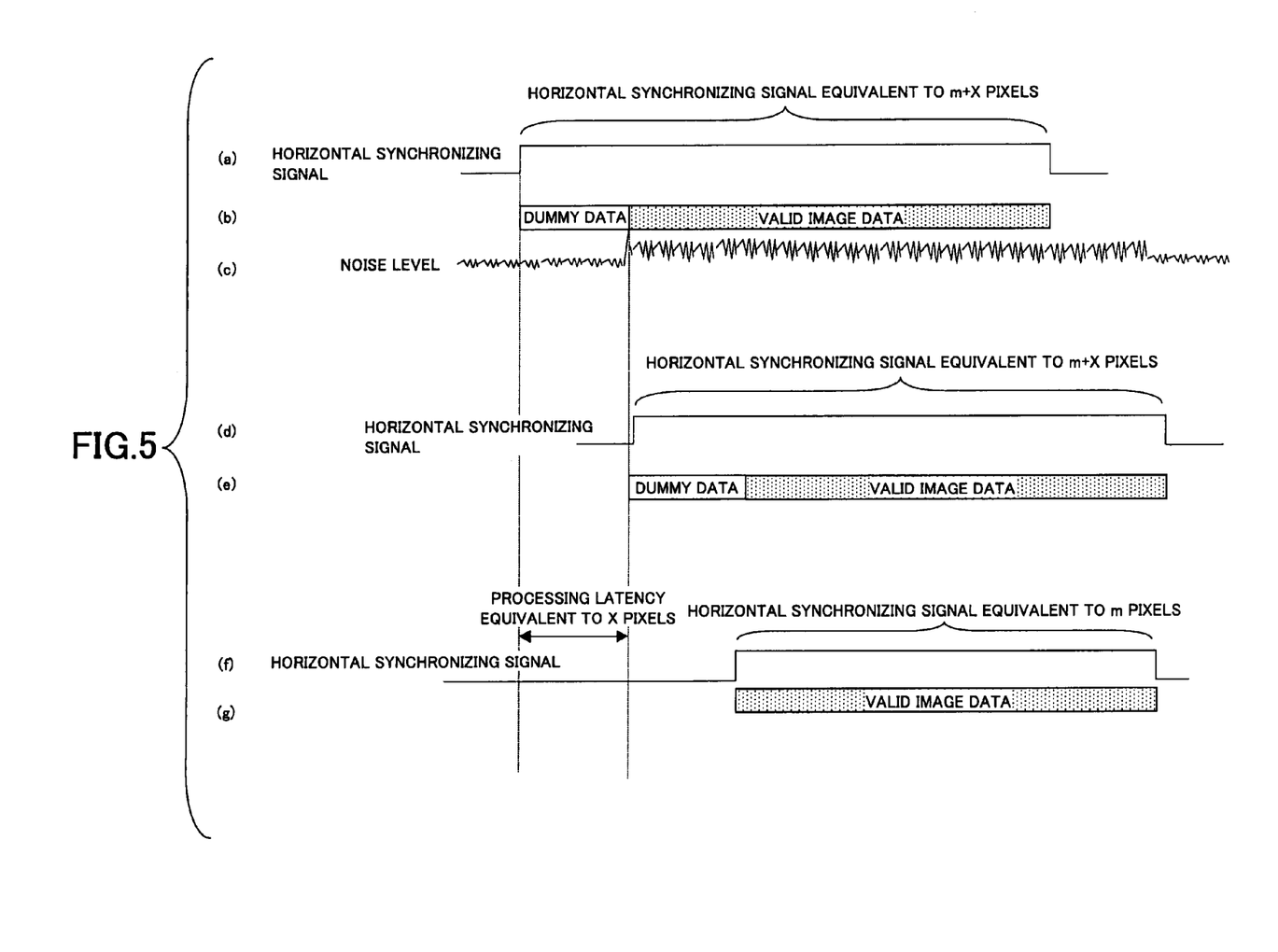
FIG. 5 is an illustrative drawing for explaining the operation of the solid-state imaging device of FIG. 4.

FIG. 5 is an illustrative drawing for explaining the operation of the solid-state imaging device of FIG. 4. In FIG. 5, (a) designates the horizontal synchronizing signal output from the image sensor 30, (b) designating the image data output from the image sensor 30, (c) designating a noise level, (d) designating the horizontal synchronizing signal output from the image-processing unit 11, (e) designating the image data output from the image-processing unit 11, (f) designating the horizontal synchronizing signal output from the horizontal synchronization correcting unit 32, and (g) designating image data that is valid during the period indicated by the horizontal synchronizing signal shown in (f).

As shown in (a), the vertical synchronizing signal output from the image sensor 30 starts earlier than the start of actual valid image data. Where the processing latency of the image-processing unit 11 is equivalent to X pixels, the horizontal synchronizing signal starts at least X pixels earlier. In the example shown in FIG. 5(a), the horizontal synchronizing signal starts exactly X pixels earlier than the start of actual valid image data. In such a case, the HIGH period of the horizontal synchronizing signal is m+X pixel long. As the horizontal synchronizing signal starts earlier, dummy data are attached in front of the valid image data as shown in (b). Without the attached dummy data, the operation of the image-processing unit 11 may not create the same kind of noise level that is created during the processing of valid image data because of lighter processing load or the like. Accordingly, the dummy data is preferably similar to the valid image data that is actually processed, and may be data that is extracted from the valid image data of an immediately preceding horizontal line, for example.

The analog circuit of the image sensor 30 operates to output the image data inclusive of the dummy data shown in (b). While the image data is being output, the image-processing unit 11 starts its operation at the timing (corresponding to a rise of the horizontal synchronizing signal illustrated in (d)) that is delayed by the processing latency from the timing of a rise of the horizontal synchronizing signal shown in (a). As a result, the noise level shown in (c) changes into a larger noise level as the image-processing unit 11 starts its operation. Since the horizontal synchronizing signal starts at least the processing latency earlier, the start of operation of the image-processing unit 11 delayed by the processing latency cannot be later than the start of the valid image data shown in (b). Namely, the generation and outputting of the valid image data shown in (b) take place during a period in which the noise level of (c) exhibits a large, constant noise level. Even though the start of operation of the image-processing unit 11 causes a change in the noise level, an effect on the operation of the analog circuit of the image sensor 30 is constant during the generation and outputting of the valid data. No code displacement is thus generated in the image data.

The horizontal synchronizing signal shown in FIG. 5(d) is corrected by the horizontal synchronization correcting unit 32 such that the first X pixels are removed. This produces the horizontal synchronizing signal as shown in FIG. 5(f). The HIGH period of this horizontal synchronizing signal matches the period of valid image data shown in (g) (which is the same as valid image data shown in (e)). In this manner, image data and a corrected horizontal synchronizing signal becoming HIGH only for the valid image data period are supplied to a circuit situated at a subsequent stage.

Figure 6:
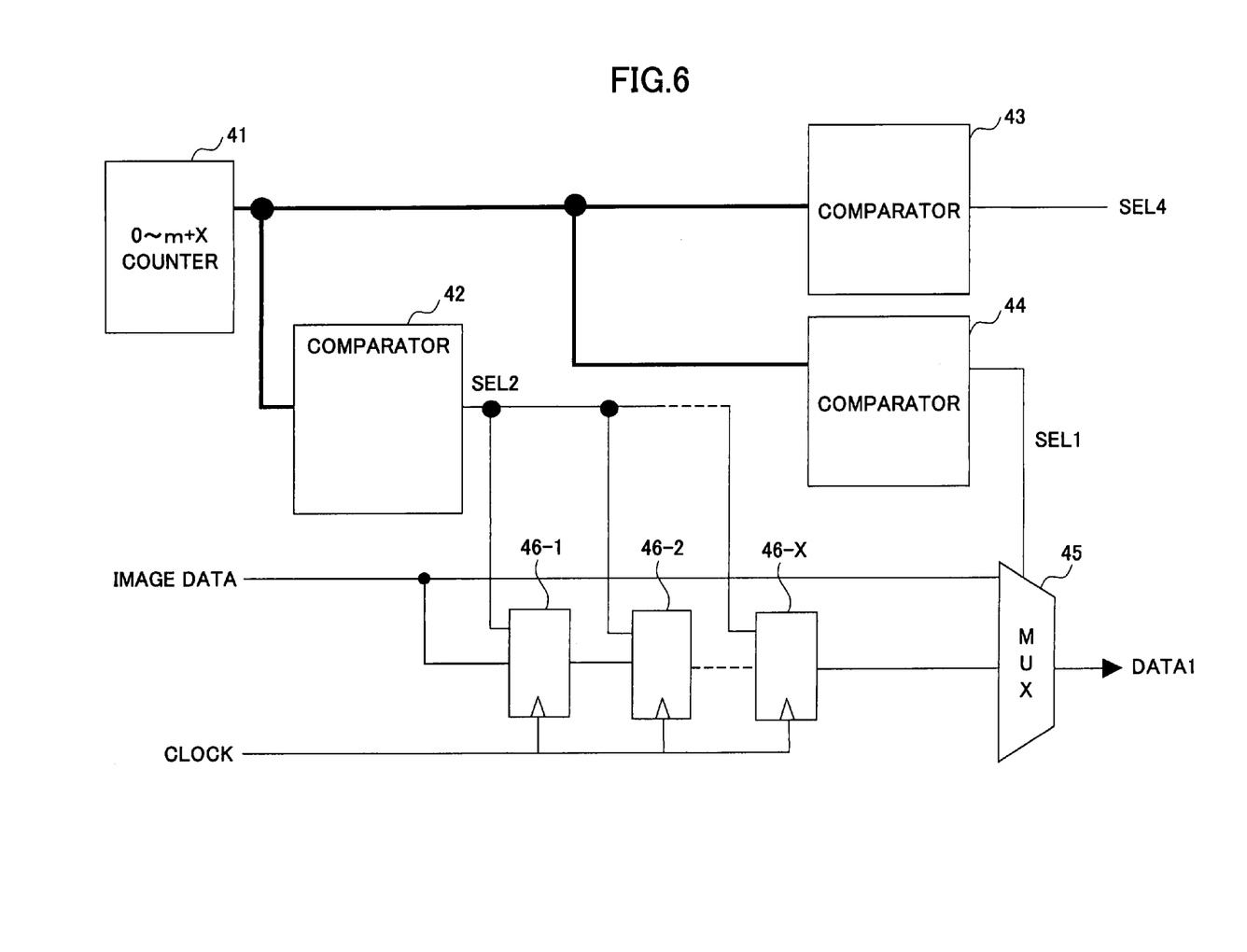
FIG. 6 is a circuit diagram showing a first embodiment of a portion of a timing generator.

FIG. 6 is a circuit diagram showing a first embodiment of a portion of the timing generator 31. The construction shown in FIG. 6 relates to a portion of the timing generator 31 that generates and outputs the horizontal synchronizing signal and image data. A portion that generates and outputs the vertical synchronizing signal is the same as in the conventional art, and an illustration thereof is omitted.

The circuit of FIG. 6 includes a counter 41, comparators 42 through 44, a multiplexer (MUX) 45, and x flip-flops 46-1 through 46-X. The counter 41 counts pulses of a clock signal generated inside the image sensor 30, and performs a counting operation from 0 to m+X. The comparators 42 through 44 compare the count of the counter 41 with respective preset values, thereby generating signals becoming HIGH for respective predetermined time periods.

The comparator 43 compares the count with X+m−1, and sets its output to HIGH when the count is smaller than or equal to X+m−1. Namely, an output SEL4 of the comparator 43 becomes HIGH for the duration of time equivalent to X+m pixels corresponding to a period from the count 0 to the count X+m−1. This is used as the horizontal synchronizing signal output from the image sensor 30. Here, image data is supplied such that the timing of the count X corresponds to the timing of the first pixel of the valid image data.

The comparator 42 compares the count with 2X−1, and sets its output to HIGH when the count is smaller than or equal to 2X−1. Namely, an output SEL2 of the comparator 42 becomes HIGH for the duration of time equivalent to 2X pixels corresponding to a period from the count 0 to the count 2X−1.

The flip-flops 46-1 through 46-X constitute an X-bit shift register. This shift register receives the output SEL2 of the comparator 42 as an enable signal, and performs shifting operations in synchronization with the clock signal. Namely, the pixel values of the first X pixels of image data corresponding to an immediately preceding horizontal line, which are already latched at a preceding cycle, are successively output to the multiplexer 45, followed by latching the pixel values of the first X pixels of image data corresponding to the current horizontal line through shifting operations. All of this is done during the HIGH period of the output SEL2 in each horizontal line. This shift register generates dummy data comprised of X pixels.

The comparator 44 compares the count with X−1, and sets its output to HIGH when the count is smaller than or equal to X−1. Namely, an output SEL1 of the comparator 44 becomes HIGH for the duration of time equivalent to X pixels corresponding to a period from the count 0 to the count X−1.

The multiplexer 45 selects the dummy data supplied from the shift register for output during the HIGH period of the output SEL1 of the comparator 44, and selects the valid image data for output during the LOW period of the output SEL1. With this provision, data DATA1 that includes X-pixel dummy data followed by m-pixel valid image data is generated.

Figure 7:
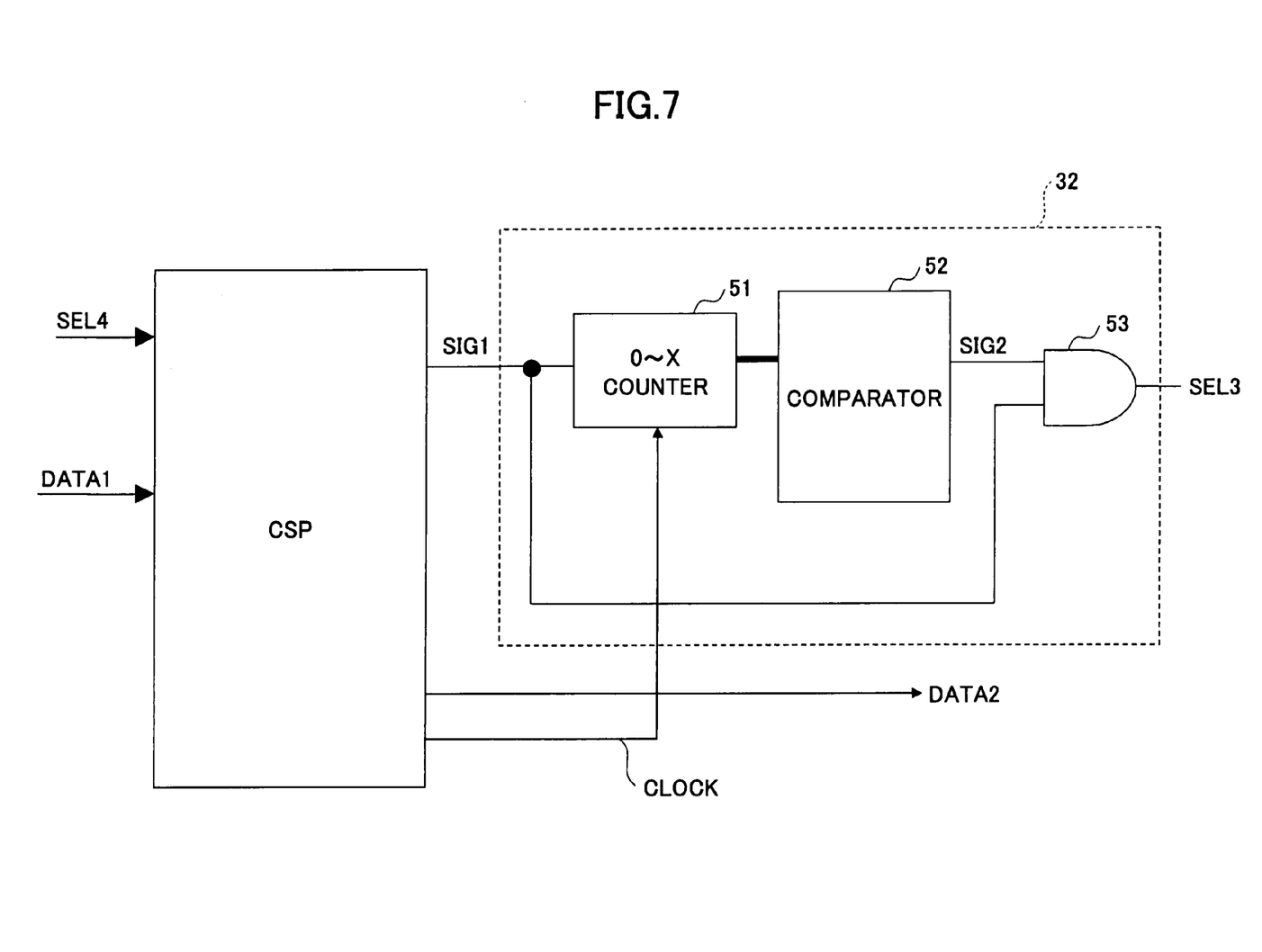
FIG. 7 is a circuit diagram showing the construction of an embodiment of a horizontal synchronization correcting unit.

FIG. 7 is a circuit diagram showing the construction of an embodiment of the horizontal synchronization correcting unit 32. The horizontal synchronization correcting unit 32 shown in FIG. 7 includes a counter 51, a comparator 52, and an AND gate 53. The counter 51 receives an enable signal that is a horizontal synchronizing signal SIG1 output from the image-processing unit 11, and counts pulses of the clock signal output from the image-processing unit 11, thereby performing counting operations from 0 to X. The comparator 52 compares the count of the counter 51 with the value X, and sets its output SIG2 to HIGH if the count is larger or equal to X. The AND gate 53 performs an AND operation between the horizontal synchronizing signal SIG1 and the output SIG2 of the comparator 52, thereby outputting a horizontal synchronizing signal SEL3 having a length of m pixels.

Figure 8:
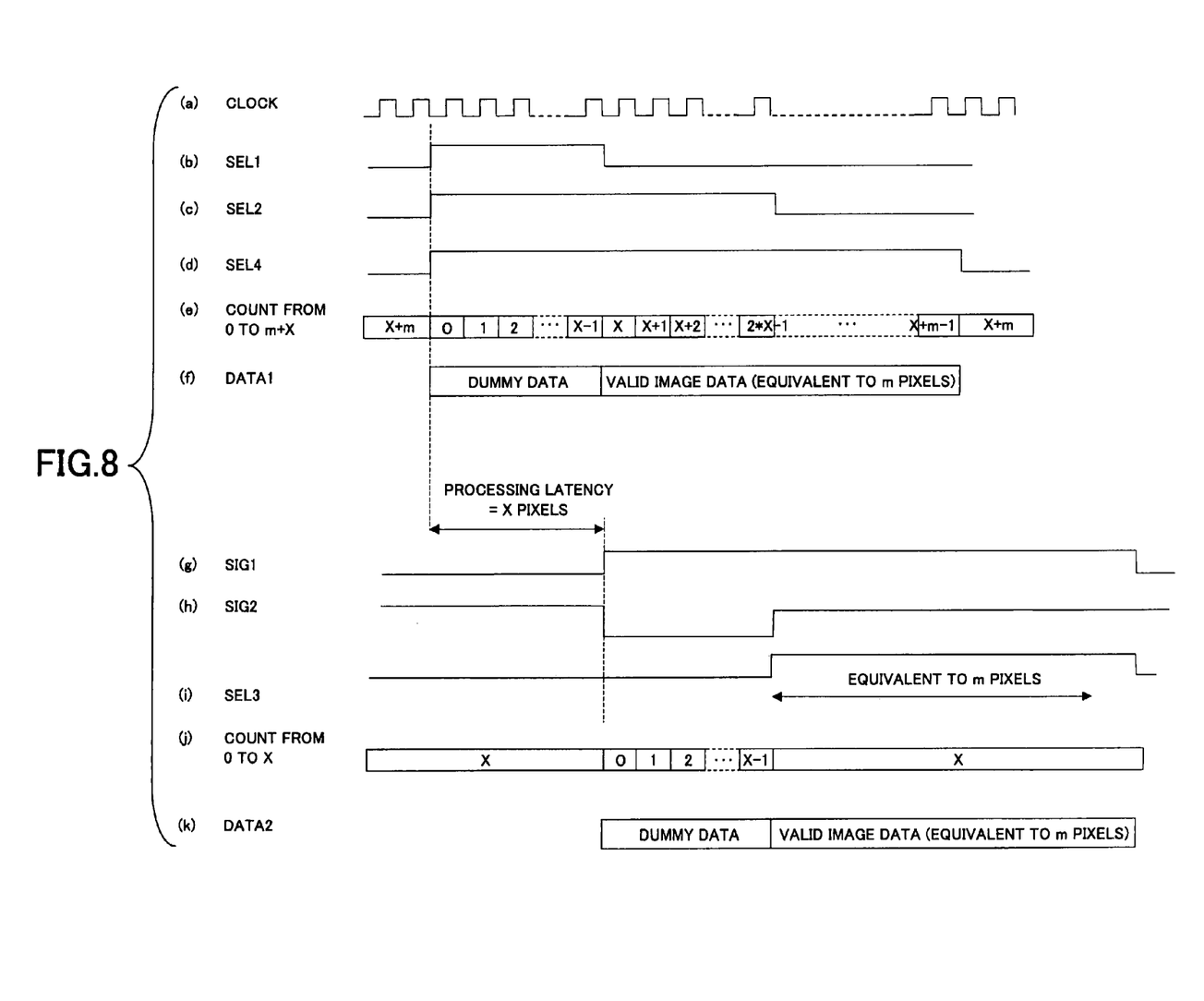
FIG. 8 is a timing chart for explaining the operation of the circuit of FIG. 6 and the horizontal synchronization correcting unit of FIG. 7.

FIG. 8 is a timing chart for explaining the operation of the circuit of FIG. 6 and the horizontal synchronization correcting unit 32 of FIG. 7. In FIG. 8, the clock signal shown in (a) is counted by the counter 41, which thus produces a count as shown in (e).

SEL1 shown in (b) is the output of the comparator 44, and becomes HIGH for the duration of X pixels corresponding to a period from the count 0 to the count X−1, as previously described. SEL1 is used to control the multiplexer 45, thereby generating image data DATA1 having X-pixel dummy data attached in front of valid image data as shown in (f).

SEL2 shown in (c) is the output of the comparator 42, and becomes HIGH for the duration of 2X pixels corresponding to a period from the count 0 to the count 2X−1, as previously described. SEL2 is used to enable the shift register comprised of the flip-flops 46-1 through 46-X so as to let the shift register successively output, for a period from the count 0 to the count X−1, the first X pixels of valid image data corresponding to an immediately preceding horizontal line having already been stored in the shift register. For a period from the count X to the count 2X−1, the shift register successively latches the first X pixels of valid image data corresponding to the current horizontal line, thereby keeping them as dummy data for use in the next horizontal line.

SEL4 shown in (d) is the output of the comparator 43, and becomes HIGH for the duration of X+m pixels corresponding to a period from the count to the count X+m−1, as previously described. SEL4 is supplied to the image-processing unit 11 as a horizontal synchronizing signal.

What is described above relates to the operation of the circuit of FIG. 6. In the following, the operation of the horizontal synchronization correcting unit 32 shown in FIG. 7 will be described with reference to FIG. 8.

The clock signal output from the image-processing unit 11 is counted by the counter 51, which thus produces a count shown in (j). SIG1 shown in (g) is the horizontal synchronizing signal output from the image-processing unit 11. The horizontal synchronizing signal SIG1 has a length of X+m pixels. SIG2 shown in (h) is the output of the comparator 52, and maintains a HIGH level after the count reaches X.

SEL3 shown in (i) is the output of the AND gate 53, which is obtained by an AND operation between SIG1 of (g) and SIG2 of (h). Since SIG2 becomes HIGH X pixels after the start of the horizontal synchronizing signal SIG1, SEL3 becomes HIGH for a period equal to the HIGH period of the horizontal synchronizing signal SIG1 minus the first X pixels. Namely, SEL3 becomes HIGH for an m-pixel period that remains after removing the first X pixels from the horizontal synchronizing signal output from the image-processing unit 11. As a result, the horizontal synchronizing signal SEL3 after correction is obtained. As can be understood, the horizontal synchronizing signal SEL3 becomes HIGH for the period that matches the valid pixel period of the image data DATA2 output from the image-processing unit 11 shown in (k).

Figure 9:
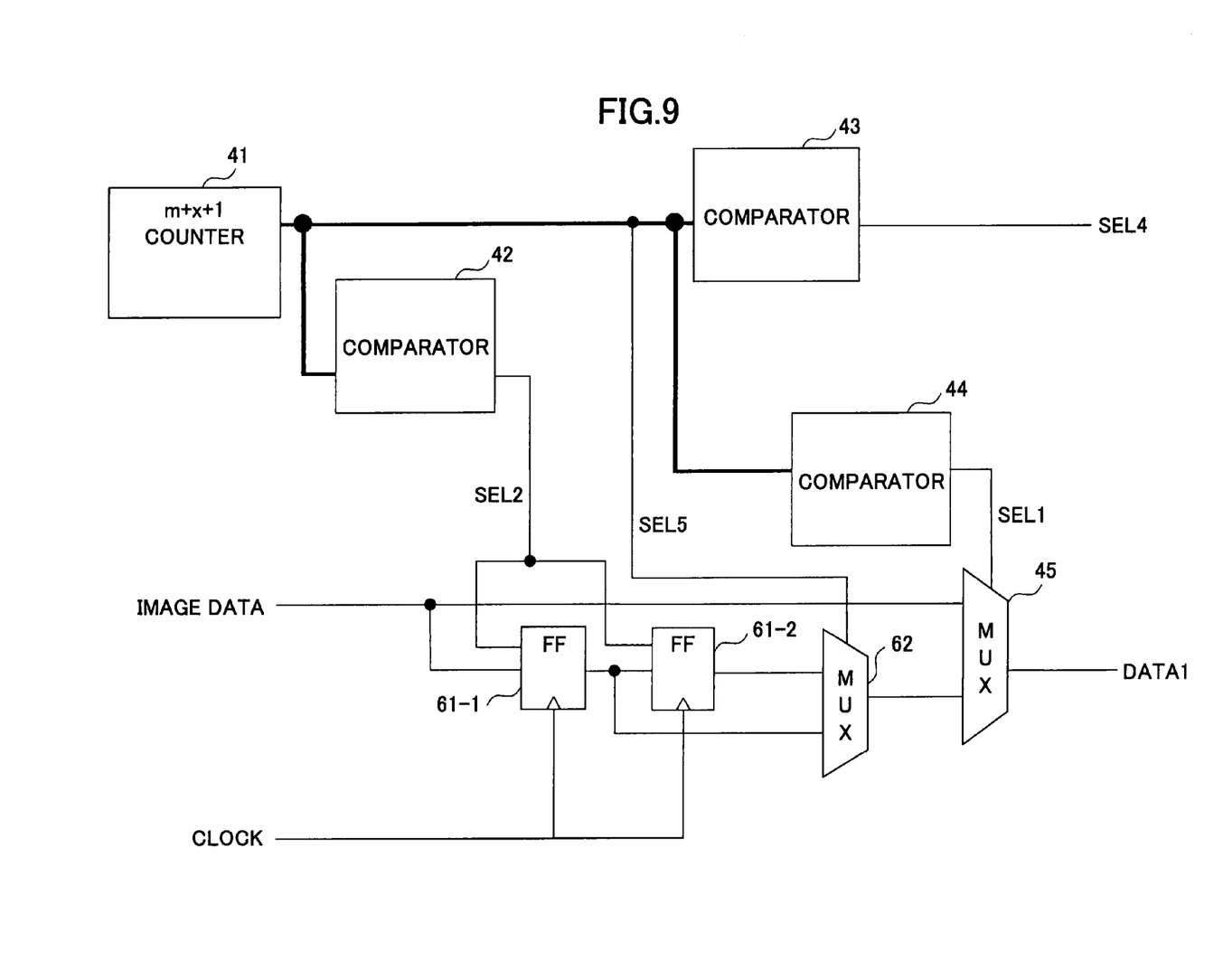
FIG. 9 is a circuit diagram showing a second embodiment of a portion of the timing generator.

FIG. 9 is a circuit diagram showing a second embodiment of a portion of the timing generator 31. The construction shown in FIG. 9 relates to a portion of the timing generator 31 that generates and outputs the horizontal synchronizing signal and image data. A portion that generates and outputs the vertical synchronizing signal is the same as in the conventional art, and an illustration thereof is omitted. In FIG. 9, the same elements as those of FIG. 6 are referred to by the same numerals.

The circuit of FIG. 9 includes the counter 41, the comparators 42 through 44, the multiplexer (MUX) 45, two flip-flops 61-1 and 61-2, and a multiplexer (MUX) 62. The counter 41 counts pulses of a clock signal generated inside the image sensor 30, and performs counting operations from 0 to m+X. The comparators 42 through 44 compare the count of the counter 41 with respective preset values, thereby generating signals becoming HIGH for respective predetermined time periods.

The comparator 43 compares the count with X+m−1, and sets its output to HIGH when the count is smaller than or equal to X+m−1. Namely, the output SEL4 of the comparator 43 becomes HIGH for the duration of time equivalent to X+m pixels corresponding to a period from the count 0 to the count X+m−1. This is used as the horizontal synchronizing signal output from the image sensor 30. Here, image data is supplied such that the timing of the count X corresponds to the timing of the first pixel of the valid image data.

The comparator 42 compares the count with X and X+1, and sets its output to HIGH when the count is larger than or equal to X and smaller than or equal to X+1. Namely, an output SEL2 of the comparator 42 becomes HIGH for the duration of time equivalent to 2 pixels corresponding to a period from the count X to the count X+1.

The flip-flops 61-1 and 61-2 constitute a 2-bit shift register. This shift register receives the output SEL2 of the comparator 42 as an enable signal, and performs shifting operations in synchronization with the clock signal. Namely, during the HIGH period of the output SEL2 in each horizontal line, the shift register latches the pixel values of the first two pixels of image data corresponding to a current horizontal line through shift operations. The multiplexer 62 receives the least significant bit of the output of the counter 41 as a select signal SEL5. The selects signal SEL5 becomes LOW when the count is an even number, and becomes HIGH when the count is an odd number. The multiplexer 62 thus selects the output of the flip-flop 61-2 when the count is an even number, and selects the output of the flip-flop 61-1 when the count is an odd number. In this manner, the multiplexer 62 alternately selects the pixel values of the two pixels to generate pixel data for provision as dummy data to the multiplexer 45.

The comparator 44 compares the count with X−1, and sets its output to HIGH when the count is smaller than or equal to X−1. Namely, the output SEL1 of the comparator 44 becomes HIGH for the duration of time equivalent to X pixels corresponding to a period from the count 0 to the count X−1.

The multiplexer 45 selects the dummy data supplied from the multiplexer 62 for output during the HIGH period of the output SEL1 of the comparator 44, and selects valid image data for output during the LOW period of the output SEL1. With this provision, data DATA1 that includes X-pixel dummy data followed by m-pixel valid image data is generated.

In the first embodiment shown in FIG. 6, the dummy data is the pixel values of the first X pixels of an immediately preceding horizontal line. In the second embodiment shown in FIG. 9, on the other hand, the dummy data is comprised of data alternately selected from the pixel values of the first two pixels of an immediately preceding horizontal line. In the second embodiment, the use of data equal in amount to two pixels as the dummy data makes it possible to reduce the number of flip-flops significantly, thereby achieving the reduction of circuit size.

Figure 10:
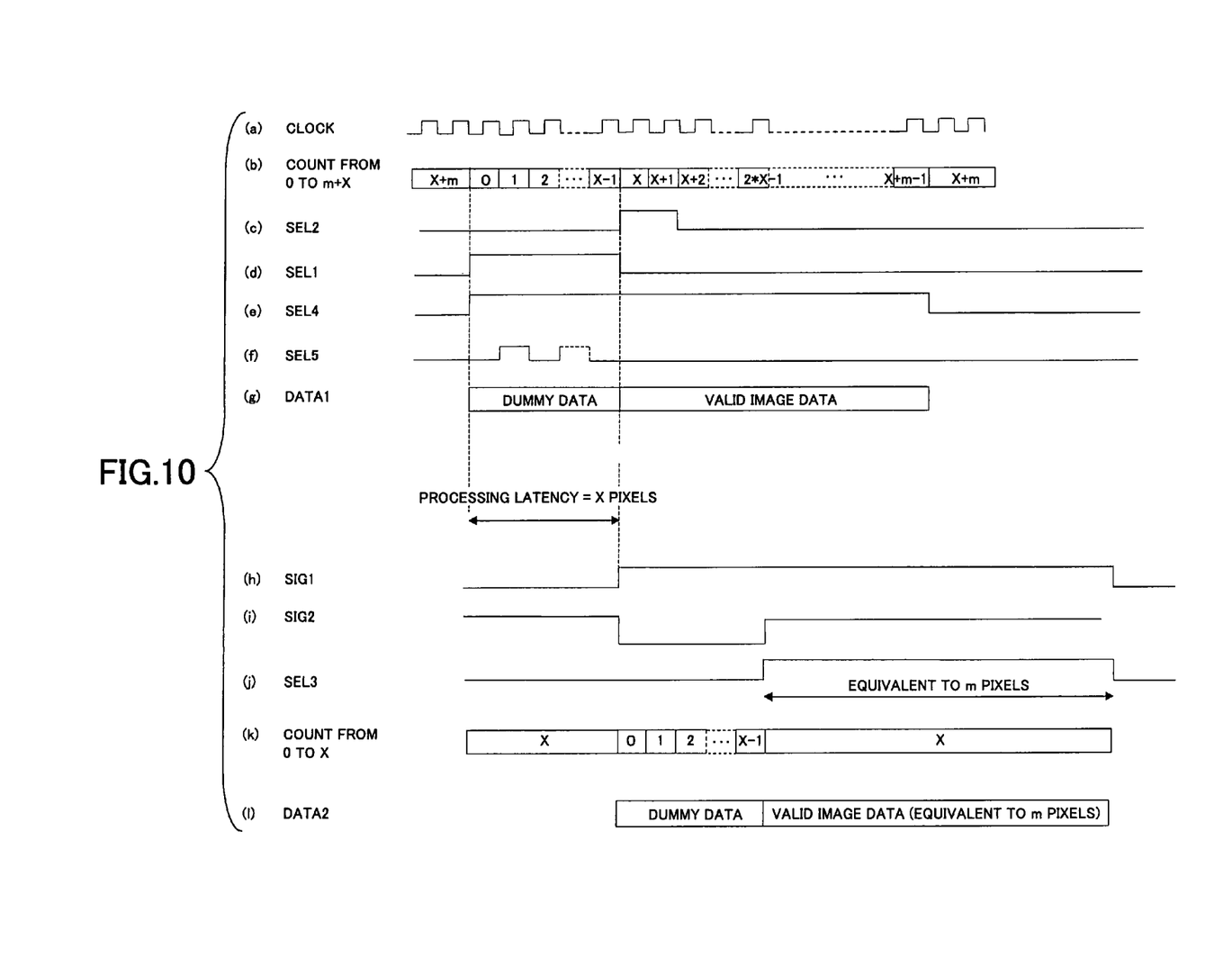
FIG. 10 is a timing chart for explaining the operation of the circuit of FIG. 9.

FIG. 10 is a timing chart for explaining the operation of the circuit of FIG. 9. In FIG. 10, the clock signal shown in (a) is counted by the counter 41, which thus produces a count as shown in (b).

SEL2 shown in (c) is the output of the comparator 42, and becomes HIGH for the duration of 2 pixels corresponding to a period from the count X to the count X+1, as previously described. Since the count X corresponds to the first pixel of the valid image data of the image data DATA1 shown in (g), the use of SEL2 to enable the shift register makes it possible to let the shift register latch the data of the first two pixels of the valid image data.

SEL1 shown in (d) is the output of the comparator 44, and becomes HIGH for the duration of X pixels corresponding to a period from the count 0 to the count X−1, as previously described. SEL1 is used to control the multiplexer 45, thereby generating image data DATA1 having X-pixel dummy data attached in front of valid image data as shown in (g).

SEL4 shown in (e) is the output of the comparator 43, and becomes HIGH for the duration of X+m pixels corresponding to a period from the count 0 to the count X+m−1, as previously described. SEL4 is supplied to the image-processing unit 11 as a horizontal synchronizing signal.

SEL5 shown in (f) is the least significant bit of the plurality of bits representing a count, which becomes LOW when the count is an even number, and becomes HIGH when the count is an odd number, as previously described. SEL5 is used to alternate the selection of the multiplexer 62, thereby alternately selecting the first two pixel values of valid image data corresponding to an immediately preceding horizontal line already stored in the shift register. Provision is thus made to generate dummy data that is inserted into the period from the count 0 to the count X−1.

What is shown in (h) through (1) of FIG. 10 relates the operation of the horizontal synchronization correcting unit 32 shown in FIG. 7. This portion is the same as a portion shown in (g) through (k) of FIG. 8, and a description thereof will be omitted.

Further, the present invention is not limited to these embodiments, but various variations and modifications may be made without departing from the scope of the present invention. In the embodiments described above, the horizontal direction is the main-scan direction, and the vertical direction is the sub-scan direction. Even if the vertical direction is the main-scan direction and the horizontal direction is the sub-scan direction, the same advantage is obtained by generating dummy data with respect to the data in the vertical direction and applying signal processing to the dummy data. In the embodiments described above, further, the horizontal synchronization correcting unit 32 is described as a separate unit from the image-processing unit 11. Alternatively, the horizontal synchronization correcting function may be incorporated into the image-processing unit 11. In the embodiments described above, the image data output from the image-processing unit 11 has dummy data attached thereto, and the image data inclusive of the dummy data is supplied to a subsequent stage. Alternatively, the dummy data may be removed from the image data by use of the corrected horizontal synchronizing signal, thereby supplying only the valid image data to the subsequent stage. In the embodiments described above, the horizontal synchronizing signal having a HIGH period corresponding to the valid period of image data was used as a signal for indicating the valid period of image data. Alternatively, any signal that properly indicates the valid period of image data, even if it is not a signal having a HIGH period matching the valid period, may as well be used, with the advancement of the timing indicated by such a signal and the insertion of dummy data, thereby to produce the same advantages as the embodiments described above.

What is claimed is:

1. A solid-state imaging device, comprising:
an image sensor configured to output image data generated by image sensing elements together with a timing signal; and
an image processing unit configured to start performing, in response to the timing signal indicating a first timing, predetermined signal processing on the image data supplied from said image sensor a predetermined delay time after the first timing indicated by the timing signal,
wherein the timing signal supplied from the image sensor to the image processing unit is separate from the image data supplied from the image sensor to the image processing unit, and indicates the first timing that is at least the predetermined delay time earlier than a second timing indicative of a start of a valid period of the image data to trigger the predetermined signal processing at the first timing, and
wherein the image data output from the image sensor to be input into the image processing unit includes dummy data preceding the image data of the valid period from the first timing to the second timing.

2. The solid-state imaging device as claimed in claim 1, wherein said image sensor includes a memory circuit that holds a portion of preceding image data that is output prior to the image data, and outputs data read from said memory circuit as the dummy data.

3. The solid-state imaging device as claimed in claim 2, where the data stored in said memory circuit is dada of a start portion of the preceding image data.

4. The solid-state imaging device as claimed in claim 2, wherein said dummy data is data for X pixels, and said memory circuit stores the data for the X pixels.

5. The solid-state imaging device as claimed in claim 2, wherein said dummy data is data for X pixels, and said memory circuit stores data for a smaller number of pixels than the X pixels, said image sensor further configured to output the dummy data for the X pixels by reading the data stored in said memory circuit repeatedly.

6. The solid-state imaging device as claimed in claim 1, further comprising a horizontal synchronization correcting unit configured to correct a timing signal output from said image processing unit to generate a corrected timing signal indicative of a start of a valid period of the image data output from said image processing unit.

7. The solid-state imaging device as claimed in claim 6, wherein said horizontal synchronization correcting unit delays the timing indicated by the timing signal output from said image processing unit by a delay length equal to a length of the dummy data, thereby generating the corrected timing signal.

8. An image sensor, comprising:
image sensing elements; and
a timing generator configured to output image data generated by the image sensing elements together with a timing signal, the image data and the timing signal are supplied to an image processing stage for performing image processing of the image data,
wherein the timing signal supplied from the timing generator to the image processing stage is separate from the image data supplied from the timing generator to the image processing stage, and indicates a first timing that is at least a processing delay time earlier than a second timing indicative of a start of a valid period of the image data to trigger the image processing at the first timing, and the image data output from the timing generator to be input into the image processing stage includes dummy data preceding the image data of the valid period from the first timing to the second timing, the processing delay time being a time period from the first timing indicated by the timing signal to a point in time at which the image processing of said image data starts at the image Processing stage in response to the timing signal indicative of the first timing.

9. An imaging method, comprising the steps of:
outputting from an image sensor a timing signal indicative of a first timing that is at least a predetermined time earlier than a second timing indicative of a start of a valid period of image data obtained from image sensing elements, the timing signal being separate from the image data output from the image sensor and triggering predetermined signal processing at the first timing;
outputting, from said image sensor, dummy data preceding the image data of the valid period from the first timing to the second timing indicative of the start of the valid period of the image data;
outputting, from said image sensor, the image data that is valid data following the dummy data after the second timing;
starting to perform, by an image processing unit responding to the timing signal indicating the first timing, the predetermined signal processing on the dummy data and the image data output from the image sensor said predetermined time after the first timing indicated by the timing signal; and
outputting, from said image processing unit, image data having undergone the predetermined signal processing and a timing signal indicative of a start of a valid period of the image data having undergone the predetermined signal processing.

* * * * *